Aug. 31, 1937.  L. C. BRADFORD  2,091,668

TRAILER COUPLER

Filed Aug. 17, 1936  2 Sheets-Sheet 1

INVENTOR.
Leslie C. Bradford
BY Everett G. Wright
ATTORNEY.

Aug. 31, 1937.  L. C. BRADFORD  2,091,668
TRAILER COUPLER
Filed Aug. 17, 1936   2 Sheets-Sheet 2
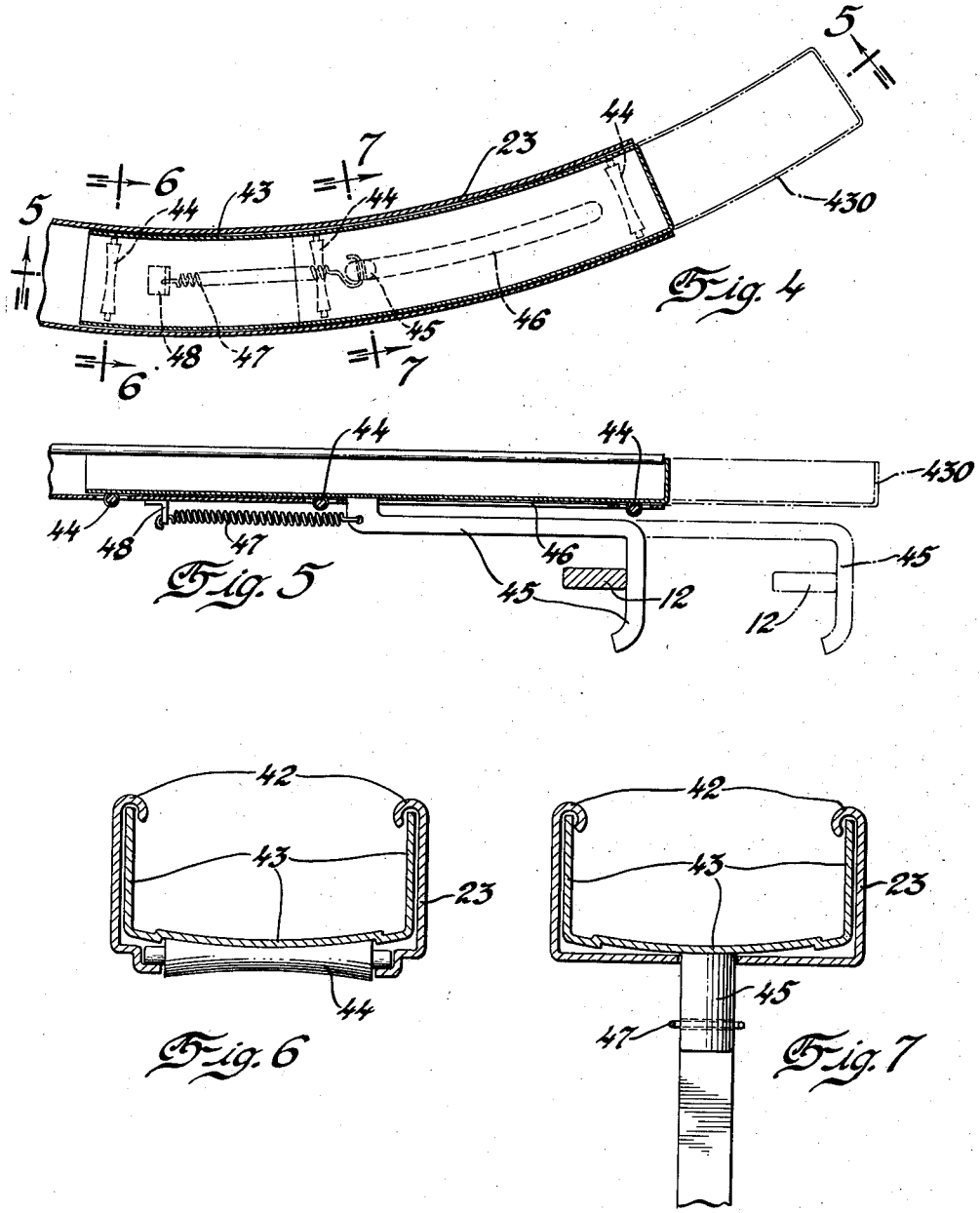
INVENTOR.
Leslie C. Bradford
BY
ATTORNEY.

Patented Aug. 31, 1937

2,091,668

UNITED STATES PATENT OFFICE 2,091,668

TRAILER COUPLER

Leslie C. Bradford, Centerline, Mich.

Application August 17, 1936, Serial No. 96,369

12 Claims. (Cl. 280—33.44)

This invention relates to automobile trailer couplers and in particular to trailer couplers adapted to minimize the whip of the trailer when being towed by a tractor.

It is recognized that the nearer a trailer drawbar is coupled longitudinally in respect to the rear axle of the tractor by which it is drawn, and the more equal the relation between the wheel base of the tractor and the distance from the coupler to the trailer wheels, if the trailer coupler is located substantially at the rear axle of the tractor, the better the trailer will track the tractor and the safer and more satisfactory the operation of the trailer. Because of the vertical spring action of the automobile which serves as a tractor and because of the difference in sway between the automobile serving as a tractor and the trailer drawn thereby, a safe trailer coupler capable of permitting a standard passenger automobile to serve satisfactorily as a tractor has not been devised heretofore.

The usual trailer coupling is made at a point on the center line of the automobile tractor at its bumper which necessitates the chamfering of the front corners of the trailer to permit the trailer to track the tractor without fouling the body, tail light or fenders of the tractor when being towed around corners. The chamfering ordinarily required is so extensive that the trailer usually is substantially pointed at its front end which pointed construction is not only expensive but causes a large loss of space within the trailer.

With the foregoing in view, one object of this invention is to provide a trailer coupler adapted to connect a trailer to an automobile in such a manner as to admit of the use of a rectangular trailer without fouling the tractor when turning around corners and the like.

Another object of this invention is to provide a trailer coupler having means in combination therewith for materially equalizing the sway between the tractor and trailer.

Another object of this invention is to provide a trailer coupler adapted to be coupled near the rear axle of the tractor and engage the tractor's bumper in such a manner as to materially equalize the sway between the trailer and tractor and decrease the tendency for the tractor to overturn when towing the trailer around curves.

Another object of this invention is to provide a trailer coupler adapted to normalize the vertical spring action of the tractor in relation to the trailer.

Another object of this invention is to provide a trailer coupler combined with resilient means on the trailer adapted to engage the bumper of the tractor for steadying the trailer whereby the driveability and roadability of the tractor-trailer is improved.

Other objects of this invention will become apparent by reference to the following detailed description taken in connection with the accompanying drawings, in which:

Fig. 4 is an enlarged plan view of a bumper extension means which may be used to permit a tractor-trailer unit coupled by the coupling means disclosed in Fig. 1 to turn on extremely short radii.

Fig. 5 is a longitudinal sectional view taken on the line 5—5 of Fig. 4.

Figure 1:
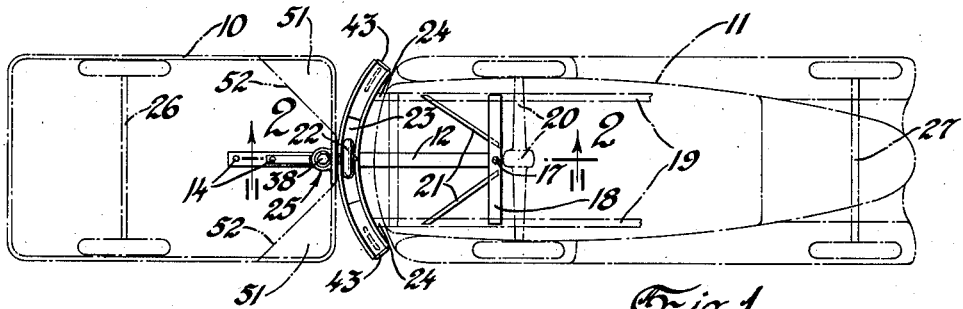
Fig. 1 is a more or less diagrammatic plan view showing a coupler embodying the invention coupling a two wheeled trailer to a standard passenger automobile.

Figs. 6 and 7 are detailed cross sectional views taken on the lines 6—6 and 7—7 respectively of Fig. 4.

Referring now to the drawings wherein like numerals refer to like and corresponding parts throughout the several views, a substantially rectangular trailer 10 is shown coupled to a standard type automobile which serves as a tractor and is generally designated by the numeral 11 in the drawings. The trailer 10 is provided with a drawbar 12 rigidly secured along the center line of the trailer 10 preferably at the underside of the floor 13 thereof by means of suitable bolts 14, washers 15 and nuts 16 locked on the bolts 14 by cotter pins 29. The drawbar 12 is coupled as hereinafter described by a coupling pin 17 to a transverse member 18 secured between the longitudinal side frame members 19 of the tractor 11 near the rear axle 20 thereof. The said transverse coupling member 18 is suitably braced by diagonal tension-compression members 21 extending from the central portion of the said coupling member 18 to the side frame members 19 at a point preferably to the rear of the said transverse coupling member 18.

A small preferably pneumatically tired wheel 22 is transversely mounted on the front of the trailer 10 for rotation on an axis parallel to the drawbar 12 thereof and vertically spaced in relation thereto. The said wheel 22 is so located as to run in an arcuate channel track type bumper 23 preferably secured on the longitudinal side frame members 19 of the tractor 11 by means of the bumper brackets 24. The said wheel 22 may be mounted for vertical adjustment, not shown, or adjustably mounted for vertical movement on shock absorbing means generally designated by the numeral 25 in the drawings.

The distance from the rear axle 20 of the tractor 11 to the axle 26 of the trailer 10 is preferably the same or as near as possible to the wheel base of the tractor 11, the said wheel base being the distance from the front axle 27 to the rear axle 20 of the said tractor 11. The radius of the arc of the channel bumper 23 is equal to the distance from the center of the drawbar coupling pin 17 to the center of the channel bumper 23.

The said drawbar 12 is preferably rectangular in shape, offset in a vertical plane as required and of spring steel capable of a reasonable amount of flexing in a vertical direction. The said drawbar 12 is connected to the channel shaped transverse member 18 of the tractor 11 for a universal movement in respect thereto by means of the coupling pin 17 which extends through suitable apertures in the top and bottom flanges of the said channel shaped member 18 and through a double tapered central aperture in the barrel shaped end 28 of the said drawbar 12. The said coupling pin 17 is maintained in its proper position by the cotter pin 29. Two springs 30, one above and the other below the said barrel shaped end 28 of the drawbar 12 located around the coupling pin 17 and between the top and bottom flanges of the channel member 18, resiliently hold the said barrel shaped end 28 of the drawbar 12 substantially central between the said channel flanges and at the same time permit universal movement of the drawbar 12 in respect to the said channel member 18. Any suitable type of quick coupling means may be used to couple the drawbar 12 to the tractor 11, however, the said coupling means preferably should be both resilient and capable of universal movement. The coupling of the drawbar 12 to the channel member 18 of the tractor 11 may be accomplished conveniently through a suitable hand-hole or trap door, not shown, through the deck 31 of the tractor 11; the said hand-hole or trap door being in the bottom of the luggage compartment of the tractor 11 if a coupé or below the rear seat thereof if a sedan.

Figure 2:
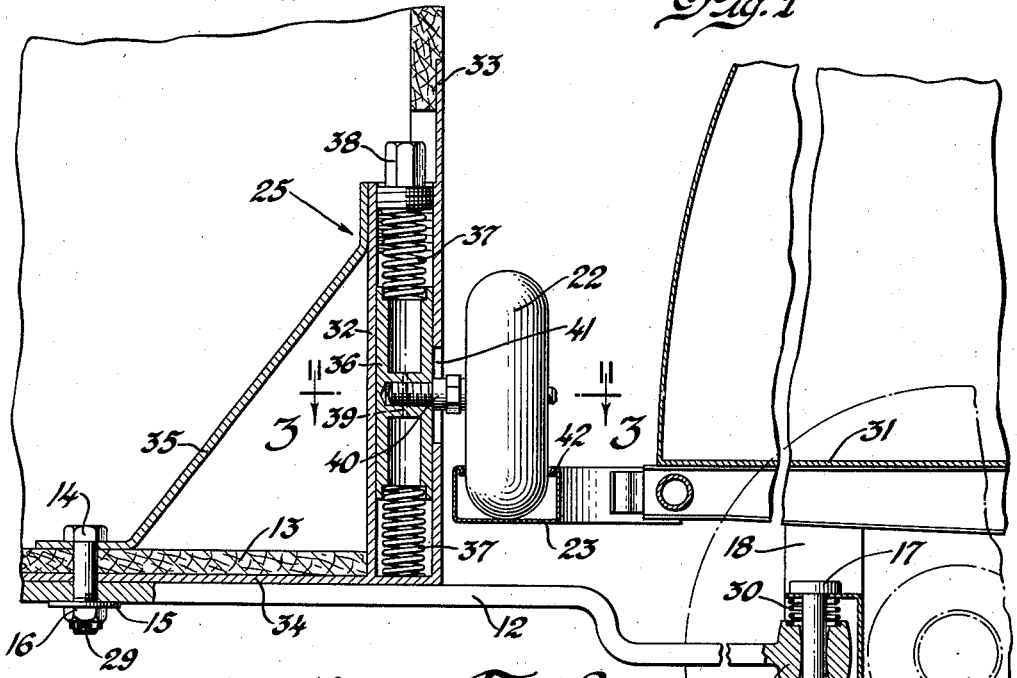
Fig. 2 is an enlarged fragmentary longitudinal sectional view taken along the line 2—2 of Fig. 1.

The shock absorbing wheel mounting 25 is centrally located on the front end of the trailer 10 and comprises a vertically disposed cylinder 32 having a front plate 33, a rearwardly extending base 34 and a diagonal brace 35 by means of which the said cylinder 32 is rigidly bolted or otherwise secured to the floor and front end of the said trailer 10. A piston 36 is reciprocatingly mounted in said cylinder 32 between two springs 37. The inside of the top of the said cylinder 32 is threaded to accommodate a threaded plug 38 which closes the top of the cylinder 32 and which may be turned down into the cylinder 32 for adjusting the compression of the springs 37 and, within reasonable limits, adjust the normal location of the piston 36 within the cylinder 32. The piston 36 is preferably bored and counterbored to provide suitable seats for the springs 37 as indicated in Fig. 2. One or more bores 39 vertically through the central portion of the piston 37 prevents the entrapment of air or oil in the cylinder 32 above and below the piston 36 during its reciprocation.

Figure 3:
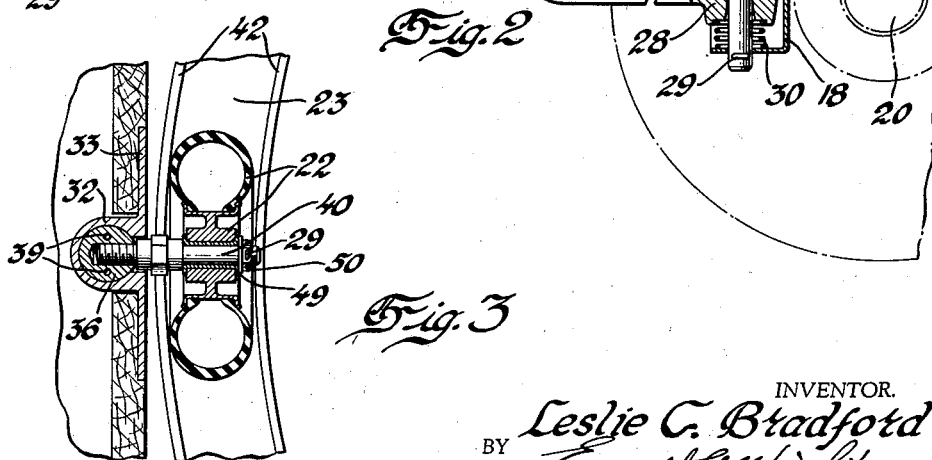
Fig. 3 is a detailed vertical sectional view taken on the line 3—3 of Fig. 2.

An axle 40 having the small pneumatically tired wheel 22 suitably journaled thereon extends through a vertically disposed slot 41 in the front of the cylinder 32 and is threaded or otherwise supported in the central portion of the piston 36 for vertical reciprocation therewith. The tired wheel 22 is removably secured in its journaled position on the axle 40 by a washer 49 and nut 50 locked on the axle 40 by a cotter pin 29, see Fig. 3. The axle 40 is of the proper length to permit the preferably tired wheel 22 to run in the channel track 23 when the trailer 10 is coupled by the drawbar 12 to the tractor 11.

The channel track 23 which, in the embodiment of the invention shown in the drawings, also serves as a rear bumper of the tractor 11 may be constructed with its upper edges rolled over as at 42 to provide additional strength in the flanges of the said channel 23 and to retain lateral extension pieces 43 thereof if such are used in combination with the invention.

Lateral channel track extension pieces 43 may be used at each end of the channel track 23 if it is desirable or required to decrease the minimum turning radius of the tractor-trailer unit. Each extension piece 43 is arcuate in shape and of such a size as will permit it to telescope in the end of the bumper channel track 23 as best shown in Figs. 4 to 7 inclusive.

The said extension pieces 43 are preferably slideably mounted on a plurality of self-centering type rollers 44 journaled in the bottom of the channel track 23. The bottom of the said extension pieces 43 are complementarily shaped to register with the said self-centering rollers 44. A hook 45 depends from each extension piece 43 through a slot 46 in the bottom of the said channel track 23 near the end thereof and is so located as to be engaged by the drawbar 12 when the trailer-tractor is turned on a sharp radius which moves the channel track extension piece 43 outward as indicated by the dot and dash lines 430 in Figs. 4 and 5. The length of the said slots 46 in the channel track 23 determines the limit of the lateral movement of the channel track extension pieces 43. A spring 47 secured to an anchorage 48 on the bottom of the channel bumper track 23 and engaging the hook 45 of the extension piece 43 returns the said extension piece 43 back into its normal position telescoped within the end of the said channel bumper track 23 when the tractor-trailer is straightened out after being turned on a sharp radius.

When the tractor-trailer is being turned at an extremely sharp radius and a channel track extension piece 43 is extended outward as indicated by the dot and dash lines 430 of Figs. 4 and 5, the said extension piece 43 cantilevers from the extreme end roller 44 with the inner ends of the vertically disposed flanges thereof reacting against the underside of the rolled edges 42 of the said channel track 23.

A trailer 10, coupled to a tractor 11 in the manner as hereinbefore described tracks the said tractor at reasonably high speeds with a minimum of whip. Also, the vertical tendency for the trailer to buckle in respect to the tractor is greatly reduced by the stabilizing effect of the preferably pneumatically tired wheel 22 which rides in the arcuate channel track 23 on the tractor 11. The resiliently mounted universal coupling between the drawbar 12 of the trailer 10 and the frame member 18 of the tractor 11 greatly reduces the transmittal of road shocks from the tractor to the trailer and from the trailer to the tractor. By the use of the type of coupling disclosed herein the corner spaces 51 bounded by the dash and two dot lines 52 in Fig. 1 is saved because the front corners of the trailer 10 need not be chamfered to prevent the said trailer 10 from fouling the tractor 11 when turning around corners and the like.

When a tractor-trailer is being driven around a turn at a fairly high rate of speed the tendency to overturn from centrifugal force is quite marked and dangerous. When a tractor-trailer coupled together in accordance with this invention is driven around a turn at a high rate of speed, the weight of the trailer 10 is concentrated on the channel track 23 of the tractor 11 on the side of the tractor 11 which is on the inside of the turn thereby materially and in most instances entirely counterbalancing the tendency of the tractor to overturn from centrifugal force.

Although but one embodiment of this invention has been disclosed and described in detail, it will be understood that various changes including the size, shape, arrangement and details of the various parts thereof may be made without departing from the spirit of the invention, and it is not my intention to limit the scope of the invention other than by the terms of the appended claims.

I claim:

1. In combination with a tractor and trailer, a trailer coupler adapted to improve the roadability of the said tractor-trailer comprising a spring steel vertically flexible drawbar rigidly secured to said trailer along the center thereof, means for coupling the said drawbar to said tractor with universal movement in respect thereto substantially at the rear axle thereof, an arcuate track on the rear of said tractor independent of its rear axle, and means on said trailer above said drawbar positioned to engage said track and ride arcuately thereon for stabilizing the vertical tendency of the trailer to buckle in respect to the tractor.

2. In combination with a tractor and trailer, a trailer coupler adapted to improve the roadability of the said tractor-trailer comprising a spring steel drawbar capable of flexing in a vertical direction rigidly secured to said trailer along the center thereof, means for coupling the said drawbar to said tractor with universal movement in respect thereto substantially at the rear axle thereof, an arcuate track on the rear of said tractor, and means on said trailer above said drawbar positioned to engage said track and ride arcuately thereon for stabilizing the vertical movement of the trailer in respect to the tractor.

3. In combination with a tractor and trailer, a trailer coupler adapted to improve the roadability of the said tractor-trailer comprising a spring steel drawbar capable of flexing freely in a vertical direction only rigidly secured to said trailer along the center thereof, means for coupling the said drawbar to said tractor with vertically resilient universal movement in respect thereto substantially at the rear axle thereof, an arcuate track on the rear of said tractor, and vertically resilient means on said trailer above said drawbar positioned to constantly engage said track and ride arcuately thereon for stabilizing the vertical tendency of the trailer to buckle in respect to the tractor.

4. In combination with a tractor and trailer, a trailer coupler adapted to improve the roadability of the said tractor-trailer comprising a spring steel drawbar capable of flexing in a vertical direction rigidly secured to said trailer along the center thereof, means for coupling the said drawbar to said tractor with universal movement in respect thereto substantially at the rear axle thereof, an arcuate track on the rear of said tractor, and vertically resilient means on said trailer above said drawbar adapted to constantly engage said track and ride arcuately thereon.

5. In combination with a tractor and trailer, a trailer coupler adapted to improve the roadability of the said tractor-trailer comprising a spring steel vertically flexible drawbar rigidly secured to said trailer along the center thereof, means for coupling the said drawbar to said tractor with universal movement in respect thereto substantially at the rear axle thereof, an arcuate bumper track on the rear of said tractor, and double acting vertically resilient means on said trailer above said drawbar adapted to constantly engage said bumper track and ride arcuately thereon.

6. In combination with a tractor and trailer, a trailer coupler adapted to improve the roadability of the said tractor-trailer comprising a spring steel vertically flexible drawbar rigidly secured to said trailer along the center thereof, means for coupling the said drawbar to said tractor with universal movement in respect thereto substantially at the rear axle thereof, an arcuate bumper track on the rear of said tractor, and double acting resilient means on said trailer above said drawbar adapted to constantly engage said bumper track and ride arcuately thereon, the said double acting resilient means being adapted to engage said arcuate bumper at various heights and under various pressures.

7. In combination with a tractor and trailer, a trailer coupler adapted to improve the roadability of the said tractor-trailer comprising a drawbar rigidly secured to said trailer along the center thereof, means for coupling the said drawbar to said tractor with universal movement in respect thereto substantially at the rear axle thereof, an arcuate channel bumper track on the rear of said tractor, and resilient means on said trailer above said drawbar adapted to constantly engage said channel bumper track and ride arcuately therein, the said arcuate channel bumper track having arcuate extension pieces at each end thereof normally telescoped within said bumper track and adapted to be extended arcuately outward by said drawbar when the said tractor-trailer unit is turned on an extremely short radius.

8. In combination with a tractor and trailer, a trailer coupler adapted to improve the roadability of the said tractor-trailer comprising a drawbar rigidly secured to said trailer along the center thereof, means for coupling the said drawbar to said tractor with universal movement in respect thereto substantially at the rear axle thereof, an arcuate channel bumper track on the rear of said tractor, and double acting resilient means on said trailer above said drawbar adapted to constantly engage said channel bumper track and ride arcuately therein, the said arcuate channel bumper track having arcuate extension pieces at each end thereof normally telescoped within extension pieces at each end thereof normally telescoped within said bumper track and adapted to be extended arcuately outward by said drawbar when the said tractor-trailer unit is turned on an extremely short radius.

9. In combination with a tractor and trailer, a trailer coupler adapted to improve the roadability of the said tractor-trailer comprising a drawbar rigidly secured to said trailer along the center thereof, means for coupling the said drawbar to said tractor with universal movement in respect thereto substantially at the rear axle thereof, an arcuate channel bumper track on the rear of said tractor, double acting resilient means on said trailer above said drawbar adapted to constantly engage said channel bumper track and ride arcuately therein, and means for simultaneously adjusting the height and resiliency of said resilient means, the said arcuate channel bumper track having arcuate extension pieces at each end thereof normally telescoped within said bumper track and adapted to be extended arcuately outward by said drawbar when the said tractor-trailer unit is turned on an extremely short radius.

10. In combination with a tractor, a trailer having a square front end and a trailer coupler adapted to improve the roadability of the said tractor-trailer and admit of the use of a square front end trailer without fouling said tractor when being drawn thereby around short radii turns; a drawbar rigidly secured to the trailer along the center thereof, means for coupling the said drawbar to said tractor with universal movement therebetween substantially at the rear axle thereof, an arcuate channel track on the rear of said tractor having the center of the coupling of the said drawbar to said tractor as the center of the arc of the said channel track, and resilient means above said drawbar adapted to constantly engage said channel track and ride arcuately therein, the said arcuate channel track having arcuate extension pieces at each end thereof normally telescoped within said channel track and adapted to be extended arcuately outward by said drawbar when the said tractor-trailer unit is turned on an extremely short radius.

11. In combination with a tractor, a trailer having a square front end and a trailer coupler adapted to improve the roadability of the said tractor-trailer and admit of the use of a square front end trailer without fouling said tractor when being drawn thereby around short radii turns; a spring steel vertically flexible drawbar rigidly secured to the trailer along the center thereof, means for resiliently coupling the said drawbar to said tractor with universal movement therebetween substantially at th rear axle thereof, an arcuate track on the rear of said tractor having the center of the coupling of the said drawbar to said tractor as the center of the arc of the said track, and resilient means for stabilizing the vertical tendency of the trailer to buckle in respect to the tractor mounted on said trailer above said drawbar adapted to constantly engage said track and ride arcuately thereon.

12. In combination with a tractor, a trailer having a square front end and a trailer coupler adapted to improve the roadability of the said tractor-trailer and admit the use of a square front end trailer without fouling said tractor when being drawn thereby around short radii turns; a spring steel vertically flexible drawbar rigidly secured to the trailer along the center thereof, means for coupling the said drawbar to said tractor with vertically resilient universal movement therebetween substantially at the rear axle thereof, an arcuate track on the rear of said tractor having the center of the coupling of the said drawbar to said tractor as the center of the arc of the said track, and resilient means for stabilizing the vertical tendency of the trailer to buckle in respect to the tractor mounted on said trailer above said drawbar adapted to constantly engage said track and ride arcuately thereon.

LESLIE C. BRADFORD.